3,299,018
METHOD FOR THE PREPARATION OF CONTROLLED MOLECULAR WEIGHT ACRYLONITRILE COPOLYMERS USING TETRAHYDRONAPHTHALENE AS REGULATOR
Allan R. Freedman, Springfield, and John T. Massengale, West Chester, Pa., assignors to FMC Corporation, Philadelphia, Pa., a corporation of Delaware
No Drawing. Filed Aug. 31, 1964, Ser. No. 393,376
4 Claims. (Cl. 260—85.5)

This invention relates to a method for the preparation of acrylonitrile copolymers. More particularly, it relates to a method of producing acrylonitrile copolymers having a controlled molecular weight.

It is necessary for the purpose of obtaining workable copolymers of acrylonitrile to control the chain length of the polymer during its manufacture. Effective molecular weight control of such copolymers has been obtained, for example, with aliphatic mercaptans such as t-dedocyl mercaptan, lauryl mercaptan, butyl mercaptan and the like. However, the objectionable odor and removal difficulties of the mercaptans make their use less than desirable.

It is an object of this invention to provide a method of preparing acrylonitrile copolymers wherein the molecular weight of the copolymer is effectively controlled.

It is another object of this invention to provide a method of controlling the molecular weight of acrylonitrile copolymers during their preparation with a substantial reduction in the odor level of the purified copolymers.

These and other objects are accomplished in accordance with this invention in a method for the polymerization reaction of from about 50 up to about 85% by weight of acrylonitrile and at least one other ethylenically unsaturated copolymerizable monomer, the improvement of which comprises carrying out the reaction in the presence of from about 0.05 to about 1.0% by weight of tetrahydronaphthalene based on the weight of the reactive monomers.

All polymerization methods of preparing acrylonitrile copolymers are included within the scope of this invention. Some of these methods include, for example, the solvent method, constant reflux method, slurry method, batch emulsion method and continuous emulsion polymerization method. Of these, the emulsion polymerization methods are preferred and particularly the continuous emulsion polymerization procedure.

Other materials of known molecular length modifying ability in solution polymerization do not work in emulsion systems. It is important, therefore, to provide a new modifying agent which is not restricted to solution polymerization procedures but which is effective in the preferred emulsion polymerization method.

The various polymerization procedures may employ various catalyst systems. For the emulsion polymerization method it is preferred that a catalyst system be used, which includes a water-soluble reducing agent or activator and a water-soluble oxidizing agent or initiator. Examples of activators include alkali and alkaline earth metal hyposulfites, bisulfites, hydrosulfites, thiosulfates and sulfites, sulfur dioxide, sulfurous acid, paratoluene sulfinic acid and the like. The activator is generally employed in an amount ranging from 0.05 to 5.0% based on the weight of the monomer reactants.

Examples of initators used in the emulsion system include ammonium and alkali metal persulfates, perchlorates, chlorates, perborates, oxalates, perdisulfates, persulfuric and chloric acids. The initiator is generally used in amounts ranging from 0.1 to 2% based on the weight of the monomer reactants.

Where it is desired to control the pH of the reactant strong mineral acids may be employed as well as buffering agents.

It also may be desirable to incorporate a ferrous ion-containing compound in the reaction medium to promote polymerization. Any ferrous salt which is sufficiently soluble in water is useful, including ferrous sulfate, chloride, bromide, nitrate, acetate, formate and the like.

Emulsifying agents are also advantageously employed in the emulsion polymerization system to provide homogeneous mixtures in a continuous or batch process. Some of the more important emulsifying agents include organic sulfates and sulfonates, alkali sulfite addition products of neutral esters of unsaturated polycarboxylic acids, alkyl aromatic sulfonates and aryl alkyl polyether sulfonates.

The amounts of the components of the coplymer chain system are dictated by practical necessities. The upper limit of 85% by weight of acrylonitrile is made necessary by the fact that higher amounts of acryonitrile produce a copolymer which is relatively difficult to work for the purpose of manufacturing useful films. The lower limit of 50% by weight is made necessary by economic considerations since acrylonitrile is an inexpensive commodity compared to other monomers, lesser amounts of acrylonitrile in the copolymer provide increasingly costly resins. Taking both cost and workability into consideration, a preferred copolymer composition is one having from about 55 to 65% by weight of acrylonitrile and a remainder of another ethylenically unsaturated copolymerizable monomer.

Examples of ethylenically unsaturated copolymerizable monomers include esters of acrylic acid and methacrylic acid with aliphatic and aromatic alcohols having up to 18 carbon atoms, vinyl acetate, vinyl propionate, styrene, isobutylene, methyl vinyl ketone, phenyl vinyl ketone, itaconic esters, maleic esters, fumaric esters, citraconic esters, mesaconic esters, styrene sulfonic acid, methacrylonitrile, vinyl ethylhexyl ether, vinylidene chloride, and the like. The preferred comonomer components for this invention on the basis of their ability to form more useful film-forming copolymer resins are the $C_1$–$C_{18}$ alkyl acrylates and methacrylates.

Tetrahydronaphthalene is used as a molecular weight modifier in polymerization systems in amounts ranging from about 0.05 up to about 1.0% based on the weight of the reactive monomers. Amounts in excess of the upper limit afford no appreciable advantage while at least the amount specified as the lower limit is needed to obtain any modifying results. The preferred amounts used range from about 0.1 up to about 0.75% by weight.

The following example is set forth to show a specific method of this invention.

EXAMPLE

A 1-liter, 3-neck flask with a side arm overflow was equipped with a stirring motor, thermometer, water-cooled condenser and 3 liquid and 1 gas feed. An aqueous catalyst solution (Feed I) of pH 3.0 and 1.5% ammonium persulfate\*, and an equal volume of an aqueous activator solution (Feed II) of pH 3.0, 0.12% sodium hydrosulfite\* and 13 p.p.m. iron ion\* were prepared and deaerated with nitrogen. A monomer mixture (Feed III) was prepared consisting of 60% by weight acrylonitrile, 25% 2-ethylhexyl acrylate, 15% ethyl acrylate, 2.7% sodium dioctyl sufosuccinate\* and 0.71% tetrahydronaphthalene\*. The polymerization vessel was charged with 400 ml. of Feed I, 400 ml. of Feed II and 200 ml. of Feed III. The rate of addition of Feeds I and II was 800 ml. per hour, and 400 ml. per hour for Feed III. The rate of cooling was maintained to give a reaction temperature of 45° C. The poly- ---
\*Based on weight of monomers.

mer was collected from the third hour on by coagulation with 2% of aluminum sulfate solution. The polymer was washed with hot water and dried. The specific viscosity of the polymer was 0.60 measured in dimethyl formamide at a concentration of 0.50% at 25° C.

The specific viscosity of a copolymer prepared in exactly the same manner as described above, except that no tetrahydronaphthalene was used had a specific viscosity of 2.03. A copolymer prepared as above with the incorporation of only 0.36%* tetrahydronaphthalene had a specific viscosity of 0.97. The copolymers prepared in this fashion had no appreciable disagreeable odor and consequently did not require excessive washing steps to remove oderiferous materials. After the usual washing steps the copolymers were substantially odor free.

The invention has worked equally well with other acrylonitrile copolymer manufacture using different or varied comonomer components.

Various changes and modifications may be made practicing the invention without departing from the spirit and scope thereof and, therefore, the invention is not to be limited except as defined in the appended claims.

We claim:
1. In a method for the polymerization reaction of from about 50 up to about 85% by weight of acrylonitrile and at least one other ethylenically unsaturated copolymerizable monomer in the presence of a redox catalyst system, the improvement which comprises carrying out the reaction in the presence of from about 0.05 to about 1.0% by weight of tetrahydronaphthalene based on the weight of the reactive monomers.

2. In a method for the polymerization reaction in an aqueous medium of from about 50 up to about 85% by weight of acrylonitrile and at least one other ethylenically unsaturated copolymerizable monomer in the presence of a redox catalyst system, the improvement which comprises carrying out the reaction in the presence of from about 0.05 to about 1.0% by weight of tetrahydronaphthalene based on the weight of the reactive monomers.

3. In a method for the polymerization reaction in an aqueous medium of from about 50 up to about 85% by weight of acrylonitrile and at least one other monomer selected from the group consisting of $C_1$–$C_{18}$ alkyl acrylates and methacrylates in the presence of a redox catalyst system, the improvement which comprises carrying out the reaction in the presence of about 0.05 to about 1.0% by weight of tetrahydronaphthalene based on the weight of the reactive monomers.

4. In a method for the polymerization reaction in an aqueous medium of from about 50 up to about 85% by weight of acrylonitrile and at least one other ethylenically unsaturated copolymerizable monomer in the presence of a water-soluble reducing agent and a water-soluble oxidizing agent, the improvement which comprises carrying out the reaction in the presence of from about 0.05 to about 1.0% by weight of tetrahydronaphthalene based on the weight of the reactive monomers.

References Cited by the Examiner
UNITED STATES PATENTS
3,110,702  11/1963  Delacretaz _____ 260—85.5

OTHER REFERENCES
Zand et al., J.A.C.S., 77 (1955), pp. 6523–4.
Baysal et al., J. Pol. Sci., 8, No. 5 (1952), pp. 529–541.

JOSEPH L. SCHOFER, *Primary Examiner.*

H. WONG, *Assistant Examiner.*

*Based on weight of monomers.